United States Patent [19]

Liden

[11] Patent Number: 5,051,910
[45] Date of Patent: Sep. 24, 1991

[54] WIND FORECAST ERROR COMPENSATION FOR 4-D GUIDANCE IN A AIRCRAFT FLIGHT MANAGEMENT SYSTEM

[75] Inventor: Sam P. Liden, Phoenix, Ariz.

[73] Assignee: Honeywell Inc., Minneapolis, Minn.

[21] Appl. No.: 422,340

[22] Filed: Oct. 16, 1989

[51] Int. Cl.⁵ .................... G06F 15/50; G05D 1/00
[52] U.S. Cl. ................................. 364/446; 364/440
[58] Field of Search ............... 364/433, 434, 446, 444, 364/440, 561, 424.06, 148, 578; 244/175, 181, 182, 183, 76 R

[56] References Cited

U.S. PATENT DOCUMENTS

| | | | |
|---|---|---|---|
| 4,467,429 | 8/1984 | Kendig | 364/440 |
| 4,642,775 | 2/1987 | Cline et al. | 364/444 |
| 4,760,530 | 7/1988 | Liden | 364/440 |
| 4,774,670 | 9/1988 | Palmieri | 364/446 |
| 4,812,990 | 3/1989 | Adams et al. | 364/444 |

Primary Examiner—Parshotham S. Lall
Assistant Examiner—Tyrone Queen
Attorney, Agent, or Firm—Arthur A. Sapelli; Roger Jensen; A. Medved

[57] ABSTRACT

In a flight management system (FMS) of an aircraft, there is included a speed generator that outputs a speed command for the aircraft in accordance with a preselected mode. The FMS further includes an apparatus performing a method for adjusting the speed to achieve a desired arrival time. The apparatus comprises a unit for generating a speed adjustment coefficient (KSA), a unit for calculating wind forecast error, and a unit for adjusting the command speed outputted from the speed generator. The adjusting unit utilizes the KSA, actual wind speed at the current aircraft position, and wind forecast error at the aircraft position. The speed adjustment compensates for the error in the wind forecast, in order to achieve the desired arrival-time.

10 Claims, 1 Drawing Sheet

WIND FORECAST ERROR COMPENSATION FOR 4-D GUIDANCE IN A AIRCRAFT FLIGHT MANAGEMENT SYSTEM

BACKGROUND OF THE INVENTION

This invention relates to a flight management system for an aircraft, and more particularly, to an apparatus and method for wind forecast error compensation for 4-D guidance in a flight management system, thereby improving arrival time performance. Controlling an aircraft to arrive at a waypoint at a prescribed time is sometimes referred to as 4-D guidance.

An aircraft flight management system (FMS) performs many functions in controlling the operation of an aircraft, including prediction of arrival time. A flight management system needs to make speed adjustments in order to achieve a required time of arrival (RTA) at a designated waypoint or destination. Such adjustments are based on repeated predictions (fast-time simulated flight) that use a wind forecast model. Wind forecasts always have errors.

Aircraft are controlled to fly air speed, rather than ground speed, because aerodynamic characteristics and operating limits are related to air speed. However, flight time is a function of ground speed, which is the sum of the horizontal component of true air speed (TAS) and tail wind (the projection of the wind vector along the horizontal flight path). FMS predictions use a model for estimating the wind, but even if this model has the correct wind over the whole flight plan at any given time, by the time the real aircraft arrives at points downstream the actual wind has undoubtedly changed. The result is that repeated speed adjustments, based on revised periodic predictions using forecast with error, tend to grow exponentially as the aircraft approaches the destination. Compounding this problem is the 250 (knots-kn) CAS speed limit that is normally in effect below 10,000 ft in USA which prevents increasing speed to compensate for unexpected head wind. Current FMS predictions use a blend of the known wind at the aircraft position with the forecast wind at the prediction positions for some distance ahead of the aircraft. This method offers a some improvement but is inadequate for improving accuracy in arrival time.

The present invention provides compensation for errors in the forecast model in order to improve the arrival-time performance.

SUMMARY OF THE INVENTION

Therefore, there is provided by the present invention, an apparatus and method for compensating for errors in the forecast model in order to improve arrival-time performance. In a flight management system (FMS) equipped for 4-D guidance of an aircraft, there is included a speed generator that outputs a speed command for the aircraft. The FMS further includes an apparatus for adjusting this speed to achieve a desired arrival time. The apparatus comprises a unit for generating a speed adjustment coefficient (KSA), a unit for calculating wind forecast error, and a unit for adjusting the command speed outputted from the speed generator. The adjusting unit utilizes the KSA, actual wind speed at the current aircraft position, and wind forecast error at the aircraft position.

Accordingly, it is an object of the present invention to provide an apparatus and method that compensates for wind forecast model error in the adjustment of the speed command in order to improve arrival-time performance.

This and other objects of the present invention will become more apparent when taken in conjunction with the following description and attached drawing, wherein like characters indicate like parts, and which drawing forms a part of the present application.

DETAILED DESCRIPTION

Figure 1:
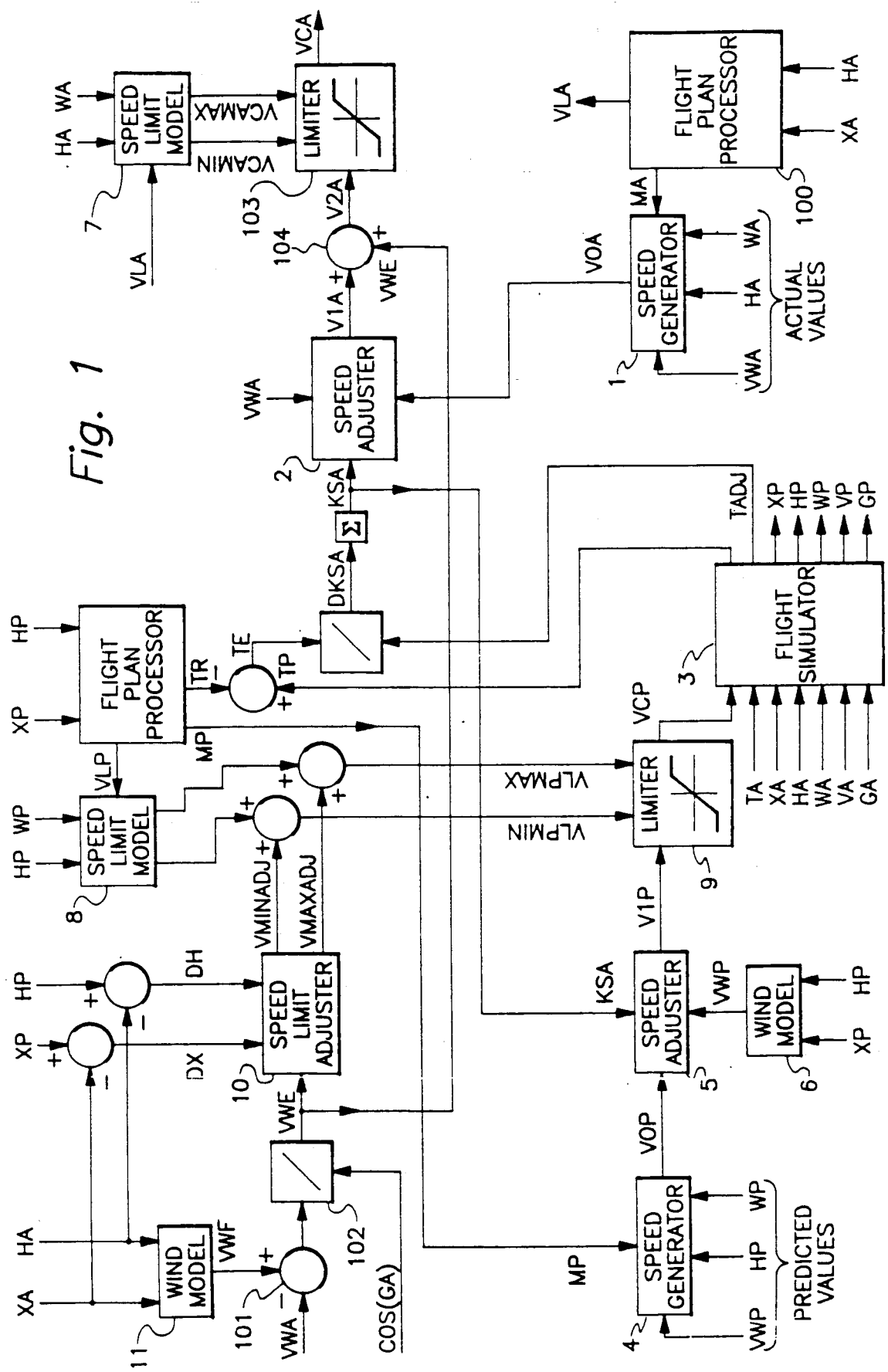
FIG. 1, the sole drawing of the present invention, shows a partial block diagram of a Flight Management System showing wind forecasting and compensation of error therein necessary for describing the preferred embodiment of the present invention.

Before presenting the detailed description of the apparatus and method of the present invention, a brief overview of the operation of the present invention is presented. When an aircraft reaches a segment with a speed-limit restriction, and encounters head winds greater than predicted, the aircraft cannot fly faster than the maximum airspeed. By estimating there is an error, based on current errors between the actual winds at the current aircraft position and the wind model, or by assuming some predetermined error always exists between the actual winds and the wind model, before reaching the speed-limit portion of the flight, then the speed can be adjusted to compensate for the error, such that when the aircraft reaches the speed-limit portion of the flight, there is still some control available. Thus, if the headwind error is as pessimistically anticipated (and compensated for) then the aircraft can fly the speed limit and attain the desired arrival time. If on the other hand, the headwind error is less than pessimistically anticipated (and compensated for) the aircraft can fly at some speed less than the speed limit, thereby still complying with the speed limit requirement and achieving the desired arrival time The apparatus and method of the present invention adjusts the command speed to compensate for wind forecast error before the aircraft reaches the speed limit portion of the flight, in order to obtain the desired arrival time and still fl within the preestablished speed limits.

Referring to FIG. 1, there is shown a partial block diagram of a Flight Management System (FMS) that is relevant to the present invention and includes the apparatus of the present invention. Table 1 identifies the variables used in FIG. 1A and 1B. The FMS includes a speed generator 1 having an output VOA, the normal desired speed of the aircraft except for limits that may be imposed on this speed. The speed VOA that is generated by the speed generator 1 depends on a variety of variables and mode parameters (from a flight plan processor 100) grouped here as MA. For the most common performance mode, referred to as the "Economy" mode, the speed VOA depends on altitude (HA), gross weight (WA), tail wind (VWA), the flight phase (climb, cruise, descent), the Cost Index (a pilot-selectable parameter that weighs the cost of time in computing the minimum cost speed), top-of-climb gross weight (for climb speed), top-of-descent gross weight (for descent speed). This list of parameters is not necessarily complete since other performance modes may have other parameter requirements well known to those skilled in the art.

TABLE 1

The following is a list of the labels used to identify the principal variables used herein. In this list of labels, '#' is replaced with 'A' for aircraft variables, or with 'P' for prediction variables:

| | |
|---|---|
| DKSA = | The change in KSA resulting from a prediction iteration |
| G# = | Flightpath angle (gamma) |
| H# = | Pressure altitude |
| KSA = | Speed adjustment coefficient |
| M# = | Set of all mode parameters that affect the speed generator, such as flight phases, performance mode, cost index, manual CAS/Mach settings, etc. |
| TADJ = | The part of the elapsed time, from the aircraft to the designated waypoint, during which speed may be adjusted in the required direction |
| TE = | Predicted arrival time error at the designated waypoint |
| TP = | Predicted time of arrival at the designaed waypoint |
| TR = | Required time of arrival (RTA) at the designated waypoint |
| V# = | True airspeed (TAS) |
| V0# = | Output of the speed generator (TAS) |
| V1# = | V0# adjusted for arrival time |
| V2A = | V1A adjusted for wind forecast error |
| VC# = | Final TAS command |
| VC#MIN = | Minimum VC# from all sources, including aerodynamic limits |
| VC#MAX = | Maximum VC# from all sources |
| VL# = | CAS (calibrated airspeed) limit imposed by the flight plan |
| VMINADJ = | Adjustment to lower speed limit for prediction |
| VMAXADJ = | Adjustment to upper speed limit for prediction |
| VW# = | Tail wind velocity (projection of wind vector along track) |
| VWE = | Wind forecast error at aircraft position |
| VWF = | Forecast tail wind at aircraft position |
| W# = | Gross weight of the aircraft |
| X# = | Horizontal distance along the flight plan |

A speed adjuster 2, part of a 4-D guidance system feature, adjusts the speed VOA to cause the aircraft to arrive at the designated waypoint (sometimes referred to herein as the 4-D waypoint) at the prescribed time. The algorithm for making this adjustment was described in U.S. Pat. No. 4,760,530, issued July 26, 1988, and assigned to the same assignee of the present application. The adjusted speed V1A is given by $$V1A = \frac{VOA + KSA \cdot VWA}{1 - KSA}$$

where KSA is the "speed adjustment coefficient" which is computed as part of the prediction process as described below, and where VWA is the tail wind. KSA is initially zero, in which case V1A=VOA.

Prediction is performed by a flight simulator 3 which forms part of the FMS, and includes those modifications to operate with the 4-D guidance system of the preferred embodiment. Six prediction state variables TP, XP, HP, WP, VP and GP (reference Table 1 for definition of labels used herein) are initialized at the analogous aircraft variables TA, XA, HA, WA, VA and GA, respectively, after which the simulation proceeds to the end of the flight plan as quickly as the simulator permits. (The choice of state variables may differ for a different FMS design). The simulation includes implementation of guidance and thrust management laws that cause the aircraft to follow the prescribed flight plan, and also modeling of the aircraft aerodynamics and engines, and of the atmosphere, including winds, in a manner well known to those skilled in the art The prediction of the preferred embodiment performed by flight simulator 3 maintains two extra variables, TUP and TDN, which are initialized to zero. They are the elapsed times for which the speed may be increased and decreased, respectively, from the start of prediction to the 4-D waypoint (the waypoint where arrival time is prescribed). They exclude the time intervals where speed changes are prevented due to speed limits and acceleration limits. When the prediction arrives at the waypoint, arrival time error TE is computed by $$TE = TP - TR$$

where TP is the predicted arrival time and TR is the required arrival time. If TE>0, then TADJ=TUP, otherwise TADJ=TDN. Then the change DKSA (or delta KSA) in the speed adjustment coefficient KSA is computed by $$DKSA = TE/TADJ$$

and KSA is updated by $$KSA(new) = KSA(old) + DKSA$$

The new KSA is immediately used to adjust the desired aircraft speed V1A. It is also used to adjust the prediction speed V1P of the next prediction cycle.

The prediction process of flight simulator 3 uses a speed generator 4 for computing VOP that is identical to the speed generator 1 used to generate the aircraft speed VOA except that the inputs are prediction variables instead of aircraft variables. A speed adjuster 5 is also identical to the speed adjuster 2, but uses tail wind VWP from the wind model 6, representing the wind forecast at future points along the flight plan. This wind model is also used by the flight simulator 3 (not shown). When the wind model is in error, the predicted arrival time TP from flight simulator 3 will be in error.

The present invention adjusts the aircraft speed by the amount of the forecast error, thereby making the aircraft fly the same ground speed profile as the prediction, and therefore giving the same arrival time as the prediction (limited only by the accuracy of the simulation). This is possible because the forecast error VWE at the aircraft position is precisely computable by wind model 11, difference input 101, and divider 102, and is given by:

$$VWE = \frac{VWF(XA, HA) - VWA}{Cos(GA)}$$

The desired aircraft speed adjusted for forecast error is then $$V2A = V1A + VWE$$

The actual tail wind at the aircraft VWA is likely to be noisy, especially in turbulent weather, making the VWE signal noisy Filtering of either of these signals is most probably required to keep such noise from the speed command signal VCA. Short-term oscillations in speed have no significant effect on arrival time but are undesirable for passenger comfort.

The preferred embodiment of the present invention also includes speed limits in its wind-forecast error compensation. A speed limit Model 7 generates maximum and minimum TAS values based on aerodynamic and performance limits that depend mostly on altitude and gross weight. The model also uses prescribed speed limits VLA (usually maximum CAS) specified for certain segments of the flight plan. The most common example of the latter is the 250 kn CAS speed limit imposed below 10,000 ft altitude at all airports in the U.S. A second speed limit Model 8 exists for prediction purposes. When the VWE adjustment calls for a speed V2A that is outside a limit, a limiter 103 prevents the aircraft from matching the predicted ground speed profile thereby inhibiting any error correction/compensation from occurring. For example, a head wind greater than the forecast below 10,000 ft in descent, where the aircraft is at its maximum TAS, reduces ground speed and cannot be made up for by increasing air speed. The speed must be increased before reaching this speed-limited segment to make up for the reduced ground speed due to the greater than forecasted headwind in that segment.

The present invention adjusts the limits of a prediction limiter 9 by an amount which ideally is an estimate of the forecast error in the speed-limit segment. If this estimate is accurate, then KSA would converge precisely to the value that adjusts the speed over the rest of the flight plan so that the aircraft ground speed can be made to match that of the prediction ground speed at all points. But the forecast error at a downstream speed-limit segment is not known and is difficult to estimate until the aircraft approaches this segment.

The present invention compensates for this forecast error by two methods.

In the first method (sometimes referred to herein as the look-ahead method), an estimate of downstream forecast error is obtained by assuming that the forecast error at the aircraft position persists for some distance ahead of the aircraft. As the aircraft approaches a speed-limited segment with headwind greater than forecast, the estimate improves and the aircraft speed is increased ahead of the speed-limit segment to compensate for inability to increase airspeed in the speed-limited segment.

A speed limit adjustment VLI is computed by speed limit adjuster 10 by multiplying the forecast error at the aircraft position VWE by a "fadeout function" (FOF). An example of a fadeout function is $$FOF = \frac{1}{1 + (DX/KX)^2 + (DH/KH)^2}$$

where $DX = XP - XA$, $DH = HP - HA$ and where KX and KH are judiciously selected fadeout parameters. Such a function should be 1 when DX and DH are both zero, and should go to zero when DX and DH get large. Representative parameter values are $KX = 200$ nmi (nautical miles) and $KX = 5000$ ft (feet). The speed limit adjustment for the first method is given by:

$$VL1 = FOF * VWE$$

The second method (sometimes referred to herein as a "pessimistic" method) to handling the forecast error in the preferred embodiment of the present invention assumes that there will always be a greater-than-forecast head wind when the aircraft is at maximum speed, and that there will always be a greater-than-forecast tail wind when the aircraft is at minimum speed. Basically, the second approach simply narrows the speed limit range by a prescribed fixed amount VL2 for the prediction. If this pessimistic prediction should turn out to be wrong, the result is that the aircraft may fly inside the speed limit instead of at the limit.

The two methods (i.e., the look-ahead and pessimistic methods) are then combined as follows to give the adjustments to the minimum and maximum speed limits for prediction:

$$VMINADJ = max(VL1, VL2)$$

$$VMAXADJ = min(VL1, -VL2)$$

that is, VMINADJ is the larger of VL1 and VL2, and VMAXADJ is the smaller of VL1 and −VL2.

While there has been shown what is considered the preferred embodiment of the present invention, it will be manifest that many changes and modifications can be made therein without departing from the essential spirit and scope of the invention. It is intended, therefore, in the annexed claims to cover all such changes and modifications which fall within the true scope of the invention.

I claim:

1. An apparatus for an aircraft for improving arrival-time performance of said aircraft, wherein said aircraft flies according to a flight plan, having a flight profile which includes a climb portion, a cruise portion and a descent portion, whereby the aircraft gets from a first point and a descent portion, whereby the aircraft gets from a first point to a second point, the first point being the starting point located on the ground and the second point being a predetermined 4-D waypoint along said flight plan, said aircraft being given a required time of arrival (RTA) at said second point, said apparatus comprising:

a) means for simulating a flight of said aircraft, the simulated flight of the aircraft following the flight plan being flown, and including input parameters which include gross weight of said aircraft, mode parameters, forecast winds along the flight plan, thereby determining a predicted time of arrival (TP) at the second point, the simulating of the flight being repeated on a predetermined time period during the entire flight;

b) means for generating a speed adjustment coefficient (KSA), said means for generating being coupled to said means for simulating, the speed adjustment coefficient being generated in response to the simulating of the flight on the predetermined time period, from the actual aircraft position to the second point; and c) means for calculating a final command speed (VCA) utilizing said speed adjustment coefficient, whereby the difference between the required time of arrival and the predicted time of arrival is minimized.

2. An apparatus according to claim 1, wherein said means for generating said speed adjustment coefficient (KSA) comprises:

a) means for generating a first predicted speed (VOP) based on flight plan prediction values;

b) means for adjusting the first predicted speed based on KSA and predicted winds, along the flight plan to generate a second predicted speed (V1P) for correct arrival time at the second point;

c) means for limiting the second predicted speed to values within a range having a predetermined minimum and maximum speed values, to generate a predicted command speed (VCP), said predicted command speed being coupled to said means for simulating;

d) means for adjusting the predetermined minimum and maximum speed values, said minimum and maximum speed values being coupled to said means for limiting; and e) means for combining the predicted time of arrival (TP) and the required time of arrival (RTA) at said second point, to generate an arrival time error (TE), said arrival time error being utilized to calculate the speed adjustment coefficient.

3. In a flight management system (FMS) of an aircraft equipped for 4-D guidance, wherein said aircraft flies according to a flight plan, having a flight profile which includes a climb portion, a cruise portion and a descent portion, whereby the aircraft gets from a first point to a second point, the first point being the starting point located on the ground and the second point being a predetermined 4-D waypoint along said flight plan, said aircraft being given a required time of arrival (RTA) at said second point, and wherein said FMS includes a speed generator means and a flight plan processor means, the speed generator means outputting a normal desired speed VOA for the aircraft, the FMS further including an apparatus for compensating for wind forecast error, said apparatus comprising:

a) means for simulating a flight of said aircraft, the simulated flight of the aircraft following the flight plan being flown, and including input parameters which include gross weight of said aircraft, mode parameters, forecast winds along the flight plan, thereby determining a predicted time of arrival (TP) at the second point, the simulating of the flight being repeated on a predetermined time period during the entire flight;

b) means for generating a speed adjustment coefficient (KSA), said means for generating being coupled to said means for simulating, the speed adjustment coefficient being generated in response to the simulating of the flight on the predetermined time period, from the actual aircraft position to the second point;

c) means for calculating wind forecast error at the current aircraft position; and d) means for adjusting the normal desired speed (VOA) outputted from the speed generator means utilizing the speed adjustment coefficient, actual wind speed at the current aircraft position, the wind forecast error at the aircraft position, to output an adjusted command speed (V2A) whereby the difference between the required time of arrival and the predicted time of arrival is minimized.

4. A method for compensating for wind forecast errors in an aircraft, thereby improving arrival-time performance of said aircraft, wherein said aircraft flies according to a flight plan, having a flight profile which includes a climb portion, a cruise portion and a descent portion, whereby the aircraft gets from a first point to a second point, the first point being the starting point located on the ground and the second point being a predetermined 4-D waypoint along said flight plan, said aircraft being given a required time of arrival (RTA) at said second point, said method comprising the steps of:

a) simulating a flight of said aircraft, the simulated flight of the aircraft outputting a predicted time of arrival (TP) at the second point;

b) generating a speed adjustment coefficient (KSA) over the entire flight plan of said aircraft in response to the simulation of the flying of said aircraft from the actual aircraft position to the second point;

c) calculating a final command speed (VCA) utilizing said speed adjustment coefficient; and d) repeating steps (a) through (c) on a predetermined time period.

5. A method according to claim 4, wherein said step for generating a speed adjustment coefficient (KSA) comprises:

a) generating a first predicted speed (VOP) based on flight plan prediction values;

b) adjusting the first predicted speed based on the speed correction coefficient and forecast winds along the flight plan to generate a second predicted speed (V1P) for correct arrival time at the second point;

c) limiting the second predicted speed to values within a range having a predetermined minimum and maximum speed values, to generate a predicted command speed (VCP), said predicted command speed being utilized in the step of simulating;

d) adjusting the predetermined minimum and maximum speed values, said minimum and maximum speed values being utilized in step (c); and e) combining the predicted time of arrival (TP) and the required time of arrival (RTA) at said second point, to generate an arrival time error (TE), said arrival time error being utilized to calculate the speed adjustment coefficient.

6. In a flight management system (FMS) of an aircraft equipped for 4-D guidance, wherein said aircraft flies according to a flight plan, having a flight profile which includes a climb portion, a cruise portion and a descent portion, whereby the aircraft gets from a first point to a second point, the first point being the starting point located on the ground and the second point being a predetermined 4-D waypoint along said flight plan, said aircraft being given a required time of arrival (RTA) at said second point, wherein said FMS includes a speed generator means and a flight plan processor means, the speed generator means outputting a normal desired speed (VOA) for the aircraft, the FMS further including an apparatus performing a method for compensating for wind forecast error, said method comprising the steps of:

a) simulating a flight of said aircraft, the simulated flight of the aircraft following the flight plan being flown, and including input parameters which include gross weight of said aircraft, mode parameters, forecast winds along the flight plan, in order to determine a predicted time of arrival (TP) at the second point, the simulating of the flight being repeated on a predetermined time period during the entire flight;

b) generating a speed adjustment coefficient (KSA) over the entire flight plan of said aircraft in response to the simulation of the flying of said aircraft from the actual aircraft position to the second point;

c) calculating wind forecast error at the current aircraft position; and d) adjusting the normal desired speed (VOA) outputted from the speed generator means utilizing the speed adjustment coefficient, actual wind speed at the current aircraft position, the wind forecast error at the aircraft position.

7. A method of compensating for wind forecast error in an aircraft, said aircraft having Flight Management System (FMS) which includes a speed generator and a flight plan processor, thereby improving arrival-time performance of said aircraft, wherein said aircraft flies according to a flight plan, having a flight profile which includes a climb portion, a cruise portion and a descent portion, whereby the aircraft gets from a first point to a second point, the first point being the starting point located on the ground and the second point being a predetermined 4-D waypoint along said flight plan, said aircraft being given a required time of arrival (RTA) at said second point, said method comprising the steps of:

a) simulating a flight of said aircraft, the simulated flight of the aircraft outputting a predicted time of arrival (TP) at the second point;

b) generating a speed adjustment coefficient (KSA) over the entire flight plan of said aircraft in response to the simulation of the flying of said aircraft from the actual aircraft position to the second point;

c) generating a normal desired speed command (VOA);

d) adjusting said normal desired speed command by the speed adjustment coefficient (KSA), said speed adjustment coefficient being generated in response to the simulation of flying said aircraft over the entire flight plan of said aircraft from the actual aircraft position to the second point, and by an actual wind velocity (VWA) at the present aircraft position, to generate an adjusted speed command (V1A); and e) repeating steps (a) through (d) on a predetermined basis during the entire flight of said aircraft.

8. A method of compensating for wind forecast error according to claim 7, wherein said normal desired speed command (VOA) is generated as a function of a predetermined number of variables and mode parameters by said flight plan processor and said speed generator.

9. A method of compensating for wind forecast error according to claim 8, further comprising the steps of:

adjusting said adjusted speed command (V1A) by a wind forecast error (VWE) at the aircraft position, thereby generating a compensated speed command (V2A).

10. A method of compensating for wind forecast error according to claim 9 further comprising the steps of:

applying limit values to said compensated speed command (V2A) to insure the compensated speed command comes within required limits, to generate a final speed command (VCA).

* * * * *